United States Patent [19]

Weik

[11] 4,213,593

[45] Jul. 22, 1980

[54] AIRCRAFT SEAT WITH CONCEALED LOCKING AND RELEASING MECHANISM

[75] Inventor: Kirby B. Weik, Litchfield, Conn.

[73] Assignee: Koehler-Dayton, Inc., New Britain, Conn.

[21] Appl. No.: 42,981

[22] Filed: May 25, 1979

[51] Int. Cl.² ..................... B65I 1/22; A62B 35/00
[52] U.S. Cl. ..................................... 248/501; 410/105
[58] Field of Search ............... 248/503.1, 502, 501; 105/482, 464, 465; 244/118 R

[56] References Cited

U.S. PATENT DOCUMENTS

| 3,392,954 | 7/1968 | Malitte | 248/501 X |
| 3,415,480 | 12/1968 | Sertich | 105/464 |
| 3,493,210 | 2/1970 | Brenner | 105/465 X |
| 3,652,050 | 3/1972 | Marrujo | 248/501 X |
| 3,800,713 | 4/1974 | Nordstrom | 244/118 R X |
| 3,933,101 | 1/1976 | Blas | 244/118 R X |
| 4,047,689 | 1/1977 | Grendahl | 105/482 X |
| 4,089,275 | 5/1978 | Pelletier | 105/465 |
| 4,144,821 | 3/1979 | Lang | 244/118 R X |

FOREIGN PATENT DOCUMENTS

| 794519 | 5/1958 | United Kingdom | 248/501 |
| 831724 | 3/1960 | United Kingdom | 248/501 |

Primary Examiner—J. Franklin Foss
Attorney, Agent, or Firm—Spencer T. Smith

[57] ABSTRACT

In combination, a track member secured to the floor of a vehicle such as an airplane, the track member having a longitudinally extending slot communicating with an interior channel, a cover member including a top portion and a pair of downwardly projecting ribs having means at the bottom thereof for latchingly engaging the bottom edge of the slot and a vehicular seat which is to be releasably secured to the track member comprising a leg and a locking assembly secured thereto including a pivotally mounted control lever selectively displaceable from an elevated release position to a lowered locking position, the lever, when at the locking position, having a portion projecting upwardly above the track member having a width and height of elevation selected so that the upwardly projecting portion will fit within the volume defined by the top and downwardly projecting ribs of the cover member, the cover member comprising means for containing and concealing from view the upwardly projecting lever portion.

1 Claim, 6 Drawing Figures

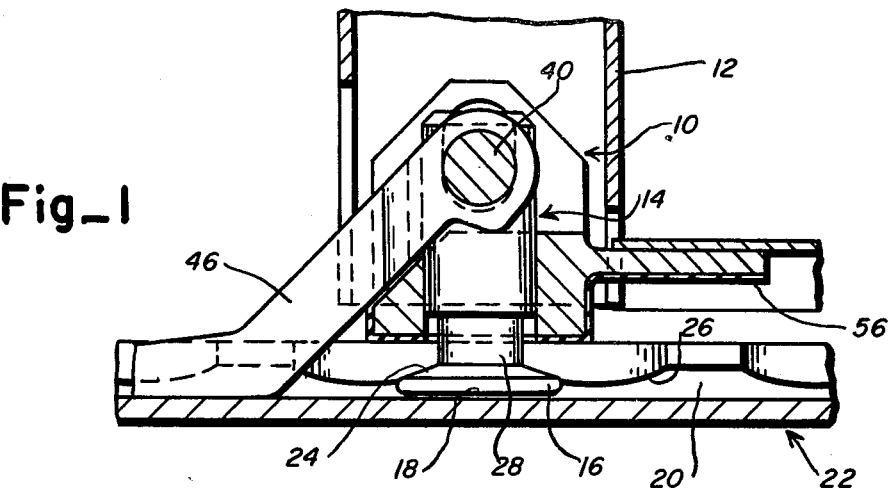
Fig_1
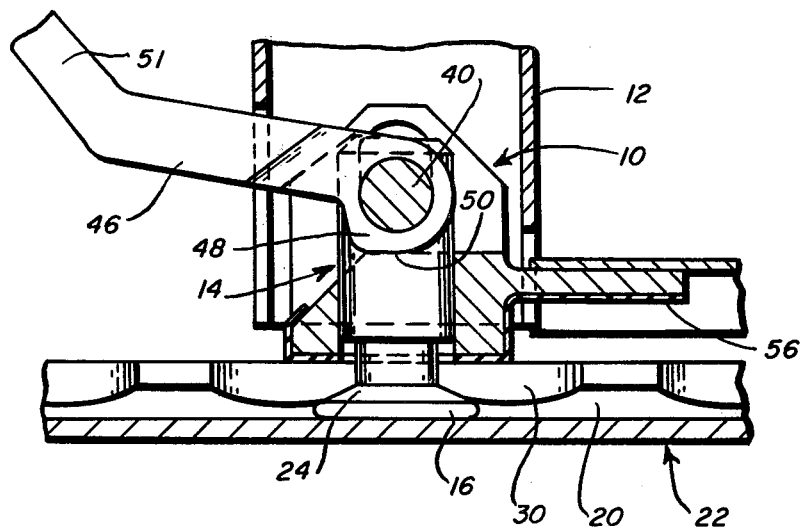
Fig_2
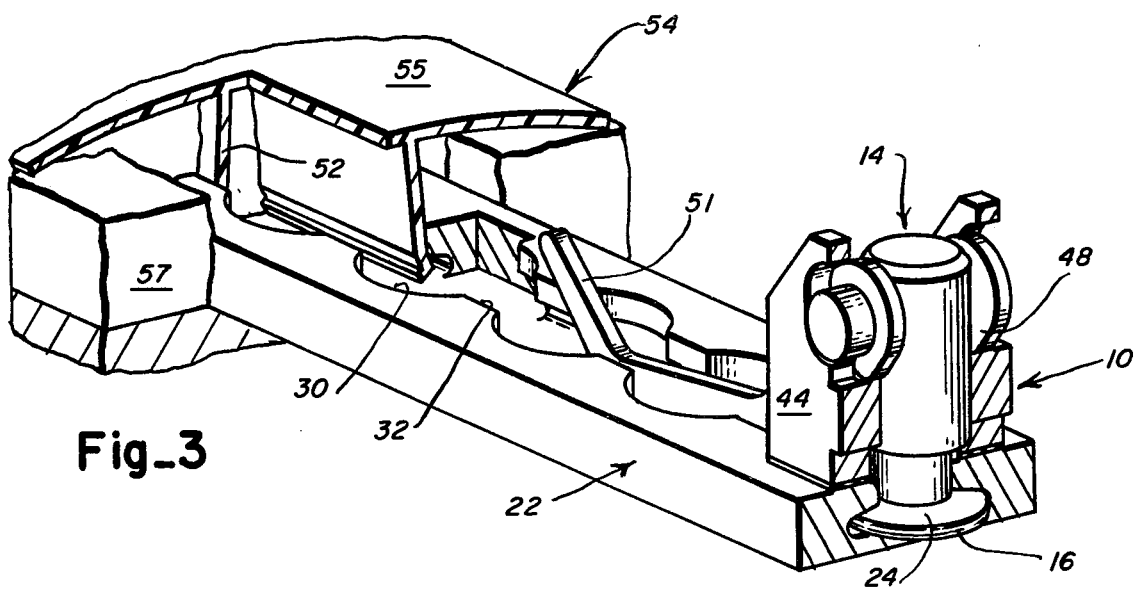
Fig_3

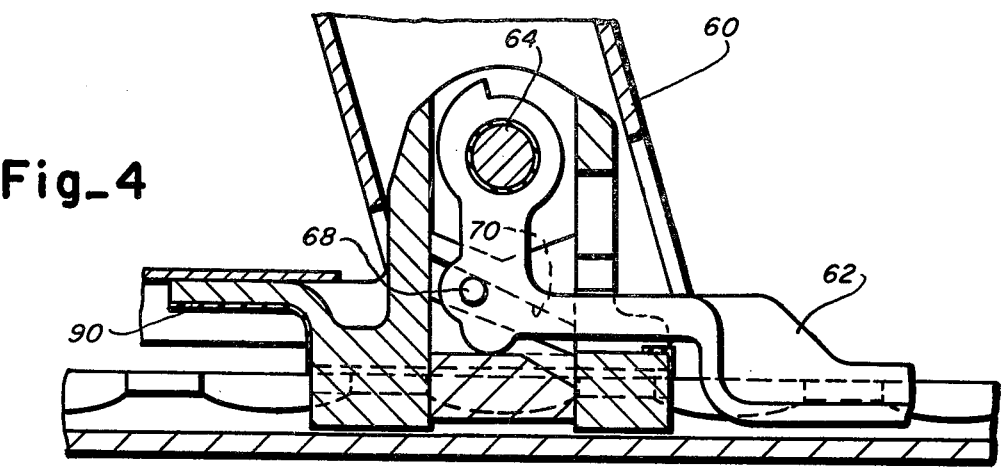
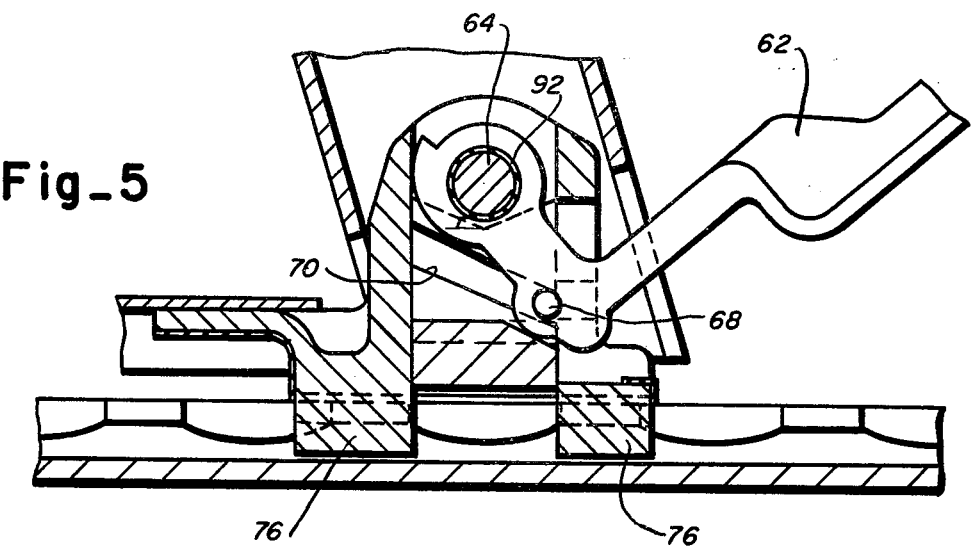
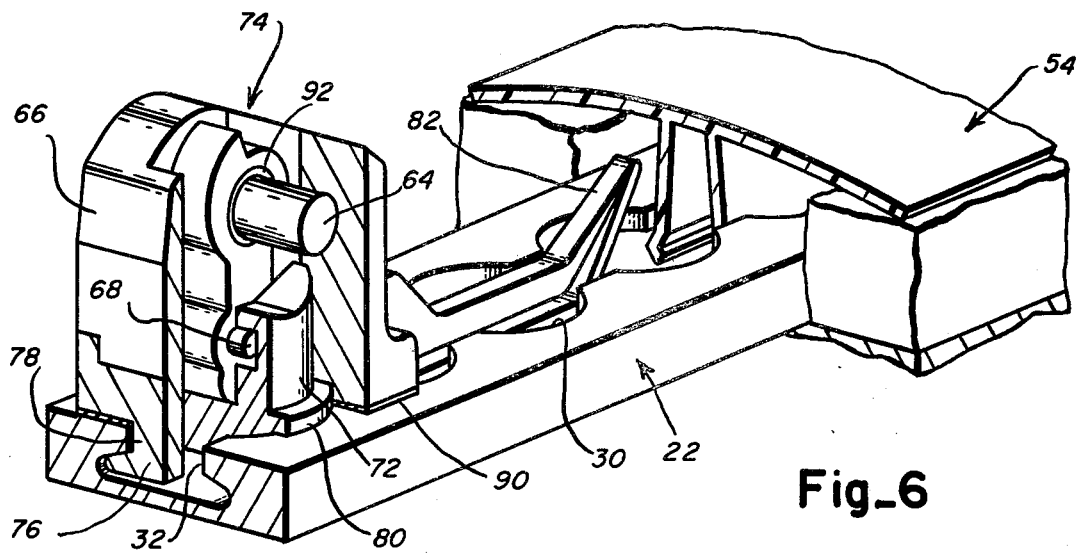

AIRCRAFT SEAT WITH CONCEALED LOCKING AND RELEASING MECHANISM

The present invention relates to vehicular seats, such as aircraft seats, which are releasably secured to track members secured to the floor of the vehicle, and more particularly, to a technology for securing the removable seats to these track members.

Conventionally, seats are secured to the track member by tightening bolts or the like with the use of hand tools, such as wrenches. This is a time consuming, and hence, undesirable technique.

It is, accordingly, an object of the present invention to provide means for securing an aircraft seat to the track members which does not require the utilization of hand tools and which can be effected in an absolute minimum of time.

Among the advantages of the instant invention is the provision of a control lever which, when in its locking position, is concealed in a standard mounting track by a standard track cover. Thus, the release mechanism is hidden from the view of the aesthetic or inquisitive passenger.

Other objects and advantages of the present invention will become apparent from the following portion of the specification and from the accompanying drawings which illustrate, in accordance with the mandate of the patent statutes, presently preferred embodiments incorporating the principals of the invention.

Referring to the drawing,

FIG. 1 is a cross-sectional view of the track locking assembly for one of the front legs of an aircraft seat in the locked condition;

FIG. 2 is a view similar to that of FIG. 1 with the track locking assembly in an unlocked condition;

FIG. 3 is an oblique view, partly broken away, of the track locking assembly illustrated in FIGS. 1 and 2;

FIG. 4 is a cross-sectional view of a track locking assembly for the rear legs of an aircraft seat shown in the locked condition;

FIG. 5 is a view similar to that of FIG. 4 with the track locking assembly in an unlocked condition; and FIG. 6 is an oblique view of the track locking assembly illustrated in FIGS. 4 and 5.

A track locking assembly 10, which is suitably secured within each of the front legs 12 of an aircraft seat or the like, includes a vertically displaceable plunger or stud element 14 having a button element 16 at the bottom thereof. The button 16 has a flat bottom surface 18 for matingly engaging the bottom surface of the internal channel 20 of the track member 22 which is suitably secured to a vehicular floor and a conical upper surface 24 for matingly engaging the top surface 26 of the internal channel 20. The conical surface of the plunger button merges into a reduced diameter section 28 of the plunger element 14. The diameter of the button element 16 is selectively dimensioned to permit its insertion into one of the plurality of vertical openings 30 in the track member 16 and the dimension of the reduced diameter section 28 of the plunger member is selectively dimensioned to be smaller than the width of the slot 32 which interconnects the vertical openings 30, to permit its displacement longitudinally along the track member.

Preliminary to locking a front seat leg in the track member, the seat leg with the seat locking assembly secured thereto is positioned so that the button element 16 passes through one of the vertical openings 30 of the track member. The seat is then longitudinally displaced locating the reduced diameter section 28 of the plunger within one of the slots 32.

The plunger member is secured to a transversely extending shaft 40 which is located within oblong openings 42 in parallel support struts 44. Fixedly secured to this shaft 40 is a control lever 46. One end of the control lever is bifurcated and includes identical camming elements 48 which are located on either side of the plunger 14. These camming elements engage camming surfaces 50 defined on the support struts 44. As the control lever is displaced downwardly from an elevated position shown in FIG. 2, to a completely depressed position, illustrated in FIG. 1, the cam elements 48 rotate elevating the plunger, and hence, the button element into forced engagement with the upper surfaces of the interior channel of the track member 22 locking the assembly to the track member.

The other end of the control lever, when in the fully depressed position, includes an upwardly extending finger engageable portion 51 which is hand operable to elevate the control lever and release the seat leg from the track member. This finger-controlled end of the lever is selectively dimensioned to have a width less than the spacing between the spaced ribs 52 of a plastic cover 54 and having an elevation above the floor of the track member less than the height of the channel defined by the top of the cover member 55 and the spaced ribs 52 of the plastic cover so that when the cover is pushed down into latching engagement with the track member (FIG. 3), the control member end portion will find itself located within the existing channel defined by the latching spaced legs of the plastic cover. The top of the plastic cover rests on a floor rug 57 or the like which extends on either side of the track member. To achieve a degree of automatic compensation for component wear, an elastomer buffer 56 may be secured to the bottom surface of the track locking assembly.

As can be seen from FIGS. 1 and 2, the control lever will be maintained at either the fully elevated (releasing) or fully depressed (locking) position by the relationship existent at that time between the lever camming elements 48 and the support strut camming surfaces 50.

The second embodiment is shown in FIGS. 4 through 6 and is a seat locking assembly for a rear leg 60 of an aircraft seat. Conventionally, a shear pin secured to the rear leg of an aircraft seat is maintained within one of the cylindrical openings 30 in the track member 22 to prevent longitudinal displacement of the seat along the track member. In this rear seat locking assembly, the control lever 62 is secured for pivotal movement on a shaft 64 mounted on opposing struts 66 of the rear seat locking assembly. The control lever is substantially L-shaped in configuration and includes an outwardly projecting pin 68 at the corner thereof which selectively enters an inclined slot 70 in the shear pin member 72 which is vertically displaceable in a mating opening in the housing 74 suitably secured to a rear seat leg. Rotation of the control lever from an unlocked position, as shown in FIG. 5, to a locked position, as shown in FIG. 4, accordingly, cams this shear pin downwardly into one of the cylindrical openings in the track assembly. The housing or fitting 74 also includes front and rear pads or buttons 76 at the bottom thereof which are selectively dimensioned so that they can be inserted down through the vertical openings 30 in the track member. The pads merge into reduced diameter sections 78 which permit longitudinal displacement of the fitting until the pad members are contained within the slot 32 defined in the track member. The shear pin portion of the fitting includes an outwardly extending flanged section 80 which engages the top surface of the track member. When the control member is lowered to the fully depressed position, this flange member forcefully engages this top surface of the track member as the control lever is lowered resulting in the upward lifting of the pad members. Further downward movement forces the flange 80 of the shear pin member downwardly against the top surface of the track member thereby locking or clamping the rear seat leg to the track member and maintaining the shear pin within one of the vertical openings.

This control member includes an upwardly extending finger engaging portion 82 which has a selected width and height above the bottom of the track member channel so that it will be received within the channel defined by the two spaced locking legs of the plastic cover member when it is latched into position to cover the track member.

To achieve a degree of automatic compensation for component wear, an elastomer buffer 90 may be secured to the bottom portion of the fitting which engages the top surface of the channel and an elastomer bushing 92 may be located between the control member and the shaft.

What is claimed is:
1. In combination,
  a track member secured to the floor of a vehicle such as an airplane, said track member having a longitudinally extending slot communicating with an interior channel,
  a cover member including a top portion and a pair of downwardly projecting ribs having means at the bottom thereof for latchingly engaging the bottom edge of said slot, and
  a vehicular seat which is to be releasably secured to said track member comprising
    a leg, and
    a locking assembly secured thereto including a pivotally mounted control lever selectively displaceable from an elevated release portion to a lowered locking position, said lever, when at said locking position having a portion projecting upwardly above the track member, said upwardly projecting portion having a width and height of elevation selected so that said upwardly projecting portion when in the lower position will fit within the volume defined by said top and downwardly projecting ribs of said cover member, said cover member comprising means for containing and concealing from view said upwardly projecting lever portion.

* * * * *